United States Patent [19]
Jackson et al.

[11] 3,853,863
[45] Dec. 10, 1974

[54] CEPHALOSPORIN C ISOLATION PROCESS

[75] Inventors: Billy G. Jackson; Martha C. Stamper; Edmond M. Bottorff, all of Indianapolis, Ind.

[73] Assignee: Eli Lilly and Company, Indianapolis, Ind.

[22] Filed: Sept. 19, 1973

[21] Appl. No.: 398,725

Related U.S. Application Data

[63] Continuation-in-part of Ser. No. 306,130, Nov. 13, 1972.

[52] U.S. Cl. .............................. 260/243 C, 424/246
[51] Int. Cl. ............................................ C07d 99/24
[58] Field of Search .................................. 260/243 C

[56] References Cited
UNITED STATES PATENTS

| | | | |
|---|---|---|---|
| 3,227,709 | 1/1966 | Oatchett et al. | 260/243 C |
| 3,234,222 | 2/1966 | Fechtig et al. | 260/243 C |
| 3,522,248 | 7/1970 | Voser | 260/243 C |

*Primary Examiner*—Nicholas S. Rizzo
*Attorney, Agent, or Firm*—William C. Martens, Jr.; Everet F. Smith

[57] ABSTRACT

N-(4-chlorobenzoyl)- and N-(2,4-dichlorobenzoyl)-cephalosporin C values are useful in processes for separating the cephalosporin C values for polysaccharide and proteinaceous impurities present in fermentation liquors. These new intermediates can be used as starting materials in cleavage processes for forming 7-amino-cephalosporin values, and the 7-amino cephalosporin values can be used form cephalosporin antibiotics such as cephalothin, cephaloridine, and cephalexin.

10 Claims, No Drawings

CEPHALOSPORIN C ISOLATION PROCESS

CROSS-REFERENCE

This application is a continuation-in-part of our co-pending application Ser. No. 306,130 filed Nov. 13, 1972.

INTRODUCTION AND BACKGROUND OF THE INVENTION

This invention relates to a process for separating cephalosporin C values from impurities derived from fermentation liquors and includes the formation of novel derivatives of such cephalosporin C values. Additionally, this invention provides new derivatives of cephalosporin C values useful in forming 7-aminocephalosporanic acid.

Cephalosporin C, obtained by fermentation, has the following structure:

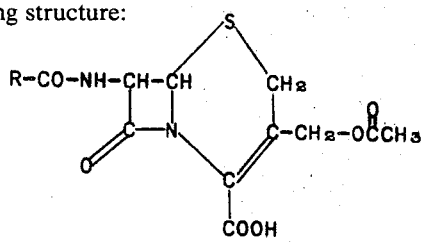

in which R is $HOOC-CH(NH_2)-(CH_3-$. It is also known as 7-(5'-aminoadipamido)cephalosporanic acid and is claimed in U.S. Pat. No. 3,093,638. It has weak antibiotic activity; however, it is important as a source of the cephalosporin C nucleus, namely, 7-aminocephalosporanic acid (7-ACA), having the following structure:

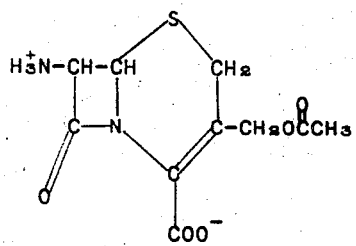

The latter is shown here in the form of its zwitterion, although anionic and cationic salts can be formed and used. Antibiotics, such as cephalothin (U.S. Pat. No. 3,218,318) and cephaloridine (U.S. Pat. No. 3,449,338) are prepared from 7-ACA by known methods. Various derivatives of 7-ACA can be prepared by reacting the 7-amino group of 7-ACA with an appropriate acylating agent, such as an acid, an acyl halide, or any other active form and/or by replacing the acetoxy group at the methyl carbon in the 3-position with any of the appropriate nucleophilic groups now well documented in the literature. Thus it can be seen that cephalosporin C is a valuable fermentation-derived antibiotic and is of special interest as starting material in the production of other more potent antibiotics.

As mentioned above, this invention in part involves a method for purifying crude cephalosporin C values obtained from or present in aqueous fermentation broths, partially purified fermentation broths, or "resin eluates." This is achieved, in part, by conversion of the cephalosporin C value to its corresponding N-(4-chlorobenzoyl)- or N-(2,4-dichlorobenzoyl)- derivative, and, thus, is achieved before cleavage of the 7-aminoadipoyl group from the cephalosporin C value.

The term "cephalosporin C values" is used herein to mean cephalosporin C and cephalosporin C-like compounds such as desacetyl cephalosporin C, desacetoxy cephalosporin C, and 3-methylthiomethyl cephalosporin C, each of which can be produced by recognized fermentation processes.

The crude cephalosporin C value which is treated in accordance with this invention can be in any of several forms and/or stages of purification. It can be in the form of a recovered crude solid containing polysaccharide and proteinaceous impurities. The cephalosporin C value can also be in its aqueous fermentation broth. This broth may or may not be one which has been subjected to pH adjustment, treated with one or more filter aids, and filtered. Such a filtered fermentation broth nevertheless is regarded for purposes hereof as an untreated broth. The aqueous cephalosporin C value medium can be a concentrated, methanol-treated fermentation broth which then is referred to as a partially treated broth. The cephalosporin C value which is treated also can be present in a resin eluate which results from treatment of a fermentation broth using one or more resin columns to partially purify the cephalosporin C value.

U.S. Pat. No. 3,160,631 describes the acylation of the sodium salt of cephalosporin C followed by esterification of the resulting product. The salt is dissolved in water and treated with sodium bicarbonate and acetone at 0°C. The resulting mixture is treated with benzoyl chloride in acetone. The reaction mixture then is extracted with chloroform, acidified, and the N-acylated cephalosporin C is extracted with methyl isobutyl ketone. The N-acyl cephalosporin C product is recovered by evaporation of the solvent and is then converted to the corresponding methyl diester.

U.S. Pat. Nos. 3,234,222 and 3,234,223 describe the use generally of a protecting group for the free amino function of an imino ether of cephalosporin C during cleavage of the cephalosporin C. However, these patents, although they do disclose, as a possible amino protecting group for the imino ether of cephalosporin C, benzoyl substituted by a halogen atom, do not disclose 4-chlorobenzoyl or 2,4-dichlorobenzoyl, and do not disclose any use for N-acylated derivatives in purifying crude cephalosporin C values.

U.S. Pat. No. 3,467,654 describes the use of acetone in the cephalosporin C initial broth filtrate to precipitate, impurities therefrom, filtration of the impurities, adsorption of the cephalosporin C from the purified filtrate using an anion exchange resin, and elution of the cephalosporin C from the resin using an acid buffer.

U.S. Pat. Nos. 3,641,018 and 3,739,002 disclose N-acylated cephalosporin C derivatives in which the acyl group is an $\alpha$-halo or an $\alpha,\alpha$-dihalo $C_2-C_4$ alkanoyl group. These derivatives, although found to be soluble in organic solvents when formed directly from a fermentation broth of cephalosporin C, are found to be difficultly soluble in suitable solvents, if soluble at all, when an attempt is made to re-dissolve them in an organic solvent.

One of the problems inherent in the use of the sodium salt of cephalosporin C as starting material in the preparation of 7-aminocephalosporanic acid (7-ACA) and, ultimately, of cephalothin and/or cephaloglycin antibiotics is attributable to the fact that, in the recovery of the sodium salt of cephalosporin C produced by fermentation, high molecular weight polysaccharides and proteins are present as impurities. These polysaccharide and protein by-products are probably produced during the fermentation and have solubility characteristics similar to those of the sodium salt of cephalosporin C. These solubility characteristics make removal of the impurities from cephalosporin C values difficult. A procedure such as membrane filtration has been successful in removing these impurities; however, this procedure is not presently adaptable to filtering the large volumes of fermentation liquors generated in a manufacturing operation. Furthermore, purification of the sodium salt of cephalosporin C by recrystallization is only partially successful because the conditions which are employed also produce precipitation of the impurities.

The high molecular weight polymeric impurities, loosely termed herein "polysaccharides" gives rise to several problems in the synthesis of cephalosporin antibiotics such as cephalothin. Cleavage of the sodium salt of cephalosporin C to 7-ACA using chloroform as solvent involves separation of an aqueous phase (containing 7-ACA) from the organic (chloroform) phase. Presence of the "polysaccharides" makes this separation difficult because the "polysaccharides" tend to stabilize a chloroform-water emulsion. A more recently developed tetrahydrofuran cleavage process was devised to circumvent the emulsion difficulty; this new process derives its success from the fact that no organic phase-aqueous phase separation is necessary. However, experience has shown that the tetrahydrofuran process merely shifts the problem to the next step, since some difficulty is still encountered in acylating the 7-ACA which is obtained from the tetrahydrofuran procedure.

Thus, a need remains for a method of avoiding the presence of detrimental quantities of "polysaccharides" in cephalosporin C values. Such a method would enhance cephalosporin conversions, such as, for example, the cephalosporin C to cephalothin process sequence. One possible solution to this problem resides in finding derivatives of cephalosporin C values which have solubility characteristics differing markedly from those of the "polysaccharide" impurities, for example, derivatives which are soluble in suitable organic solvents but insoluble in water.

The search for a cephalosporin C derivative which has these desired properties has not been easy, and the finding of such a suitable derivative has been entirely unexpected. Various N-(protected) cephalosporin C derivatives have been made and studied for possible use as intermediates in the process for making 7-aminocephalosporanic acid (7-ACA) from cephalosporin C. However, most of those examined do not readily form the desired crystalline derivative from an aqueous-organic solvent system. For example, the free acid forms of N-(p-nitrobenzoyl)cephalosporin C, N-(p-toluenesulfonyl)cephalosporin C, N-(benzenesulfonyl)cephalosporin C and N-(p-chlorobenzenesulfonyl)cephalosporin C do not form crystalline products. In addition, the free acid forms of N-propionyl-, N-benzoyl-, and N-chloroacetyl-cephalosporin C do not readily crystallize from an aqueous-organic solvent system. However, certain cephalosporin C derivatives have been discovered which exhibit desirable solubility characteristics capable of being employed to advantage in processes for preparing 7-ACA and/or other similar 7-amino cephalosporin compounds.

It is an object of this invention to provide new derivatives of cephalosporin C values which have solubility characteristics markedly different from those of "polysaccharides," cephalosporin C values, and salts of cephalosporin C values. Specifically, the new derivatives of cephalosporin C values are soluble in common organic solvents and insoluble in water.

It is a further object of this invention to provide an improved process for separating cephalosporin C values from crude solutions thereof. This improved process envisions the conversion of cephalosporin C values to selected derivatives. Conversion to these selected derivatives enables the ready separation of insoluble "polysaccharide" impurities from soluble derivatives of cephalosporin C values. The improved process additionally permits the crystallization of the derivatives of cephalosporin C values free from contaminating "polysaccharides" and the processing of the derivatives to form 7-ACA and/or other 7-amino cephalosporins.

SUMMARY OF THE INVENTION

Briefly, this invention provides an improved process for separating a cephalosporin C value of the formula

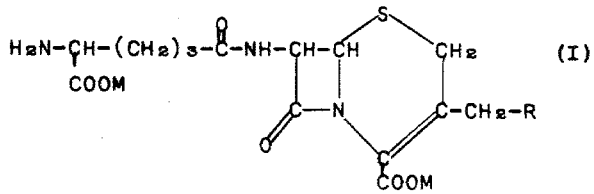

in which each M is hydrogen or an alkali metal, and R is hydrogen, acetoxy, hydroxy, or methylthio, from polysaccharide and proteinaceous impurities, which comprises A. reacting the crude cephalosporin C value of formula (I) in an aqueous liquid medium containing a miscible, inert organic solvent and containing said impurities with a 2,4-dichlorobenzoyl halide or a 4-chlorobenzoyl halide to form an N-acyl cephalosporin C value of the formula (II)

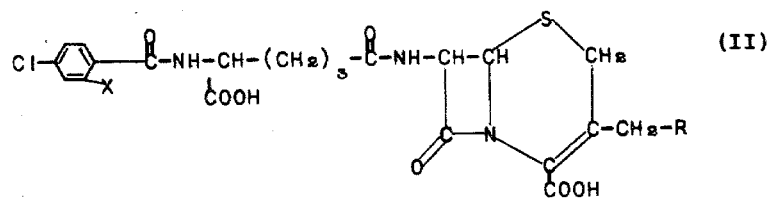

in which X is hydrogen or chlorine and R is as defined above, which compound is soluble in the aqueous-organic liquid medium; and B. separating polysaccharide and proteinaceous impurities from said N-acyl cephalosporin C value.

Separation of the polysaccharide and proteinaceous impurities as defined in step (B) hereinabove can be accomplished by any of a number of treatment sequences.

One such sequence involves treating the aqueous liquid medium containing the impurities and the N-acyl cephalosporin C value by
1. separating insolubles from said aqueous-organic liquid medium;
2. treating the liquid medium from step (1) to crystallize the N-acyl cephalosporin C value;
3. separating the N-acyl cephalosporin C value;

4. dissolving the separated N-acyl cephalosporin C value in an organic water-miscible liquid solvent containing up to about 15 percent water;
5. separating insolubles from the liquid mixture obtained in step (4);
6. treating the liquid fraction from step (5) with an aqueous medium to precipitate the N-acyl cephalosporin C value; and
7. separating the precipitated N-acyl cephalosporin C value from the liquid mixture.

Another such sequence involves treating the aqueous liquid medium by
1. separating insolubles from said aqueous-organic liquid medium;
2. treating the liquid medium from step (1) to crystallize the N-acyl cephalosporin C value;
3. separating the N-acyl cephalosporin C value;
4. dissolving the separated N-acyl cephalosporin C value in a solvent suitable for carrying out cleavage of the 7-acyl group; and
5. separating insolubles from the solution obtained from step (4).

A further such sequence involves
1. separating insolubles from said aqueous-organic liquid medium;
2. lowering the pH of the insolubles-free aqueous-organic liquid medium to from about pH 1.5 to about pH 3.5; and
3. adding quinoline to the insolubles-free aqueous-organic liquid medium from step (2) to precipitate purified N-acyl cephalosporin C value in the form of its quinoline salt.

In further operation of the process of this invention, the compound of formula II or a quinoline salt derivative thereof is treated to cleave the 7-acyl side chain and to form the 7-amino cephalosporin nucleus compound.

Compounds of formula II or their corresponding quinoline salts are believed to be new and also form a part of this invention.

DETAILED DESCRIPTION OF THE INVENTION

According to this invention, it has been discovered that the N-(4-chlorobenzoyl)- and N-(2,4-dichlorobenzoyl)- derivatives of cephalosporin C and related compounds (formula II above) in the form of their free acids or quinoline salts thereof have properties which differ markedly from those of cephalosporin C values and their corresponding salts. Specifically, it has been discovered that crude cephalosporin C values containing impurities derived from fermentation liquors can be purified by a particular sequence. This sequence involves converting the crude cephalosporin C value to its corresponding derivative II and separating insoluble impurities from the thus-produced derivative. The crude cephalosporin C value is converted to the derivative II in the presence of an aqueous medium containing a water-miscible inert organic solvent. By "inert" is meant an organic solvent which will not react with the 2,4-dichlorobenzoyl halide or 4-chlorobenzoyl halide employed in preparing the derivative of the cephalosporin C value. Typical water-miscible inert organic solvents include, for example, ketones, such as acetone and the like; ethers, such as dioxane, tetrahydrofuran, dimethoxyethane, diethoxyethane, and the like; and nitriles, such as acetonitrile, and the like.

Preferably, the 2,4-dichlorobenzoyl halide or 4-chlorobenzoyl halide is the bromide or the chloride, and, more preferably, the chloride. The halide is reacted, generally in about a 3–15 percent molar excess, with the cephalosporin C value in aqueous medium which contains a water-miscible inert organic solvent.

The water-miscible organic solvent generally is present in an amount approximately equal on a volume basis to that of the aqueous medium. However, a mixture comprising an excess of either the aqueous medium or the organic solvent up to about 10:1 on a volume basis can also be employed.

The acylation generally is carried out in an aqueous alkaline medium sufficient to form an alkali metal salt of the cephalosporin C value. This is accomplished by addition of an alkali metal hydroxide, particularly sodium hydroxide, to the reaction mixture. The acylation is carried out preferably at a temperature of from about 0°C. to about room temperature, and the acylating agent is added to the previously prepared alkaline mixture, maintained during addition at the desired reaction temperature and at the alkaline pH which generally will be from about 9.0 to about 9.5. The pH is maintained during addition of the acylating agent by further addition as necessary of an alkaline reagent. The alkaline reagent preferably can be a tertiary amine, such as triethylamine, and the like, or an alkali metal hydroxide, such as sodium hydroxide, and the like. Preferably, the alkaline reagent is sodium hydroxide.

Upon formation of the derivative of the caphalosporin C value, the pH of the reaction mixture preferably is lowered from about 9.0 to about 9.5 at which it was maintained during acylation, to about 5.5 to 6.5. At these conditions the derivative of the cephalosporin C value remains in solution while a major portion of the impurities, variously termed "polysaccharides," polymeric impurities, and the like, remain insoluble and are readily removed.

The impurities are separated from the derivative II of the cephalosporin C value by any of a variety of techniques and sequences, each of which participates in the overall purification process of this invention. The essence of this invention resides in the discovery of the difference in solubility properties of the derivatives II of the cephalosporin C values relative to those of the polysaccharide and proteinaceous impurities.

Thus, an initial treatment of the aqueous medium which contains a water-miscible inert organic solvent and the derivative II may involve separation, for example, by filtration, decantation, centrifugation, filter press procedures, or the like, of impurities from the derivative of the cephalosporin C value.

The derivative II then is recovered from the partially purified solution thereof, for example, by lowering the pH of the mixture to a more acidic range, for example, from about pH 1.5 to about pH 3.5. Removal of the derivative can be facilitated by adding water to the mixture of lowered pH to diminish the solubility of the derivative in the medium. The derivative II can be isolated as such, that is, as its free acid, or as an addition salt thereof, for example, the quinoline salt, of the derivative II.

The quinoline acid addition salt is readily prepared simply by adding quinoline to the mixture containing the free acid N-acyl derivative of the cephalosporin C value. An equimolar quantity of quinoline based upon the cephalosporin C value is sufficient. However, preferably an excess, usually from about 1.5 to about 12 moles of quinoline per mole of N-acyl cephalosporin C value is employed.

In order to accomplish further removal of impurities which may be present, the thus-covered derivative of the cephalosporin C value can then be treated in either of two general ways. One method comprises subjecting the recovered derivative to recrystallization under controlled conditions designed to eliminate residual amounts of polymeric impurities. This is achieved by dissolving the derivative in an organic water-miscible solvent. In the event that the derivative of the cephalosporin C value is in the form of its free acid, it can be dissolved as such in the organic water-miscible solvent. If the derivative is in the form of its quinoline salt, it can be dissolved as such or can be treated so as to be present in the solvent as its corresponding free acid.

Typical organic water-miscible solvents include, for example, ketones, such as acetone, and the like; ethers, such as dioxane, tetrahydrofuran, dimethoxyethane, diethoxyethane, and the like; alcohols, such as methanol, ethanol, n-propanol, isopropyl alcohol, and the like; and nitriles, such as acetonitrile, and the like. The organic water-miscible solvent may contain water, and, if it does, it preferably contains a minor amount of water, up to about 15 percent.

Under these conditions of recrystallization, residual amounts of the impurities remain insoluble and are readily removed by any of the hereinbefore mentioned techniques. The derivative of the cephalosporin C value is precipitated from the thus-purified solution by addition of water and is separated in the form of its free acid or its quinoline salt. When this particular sequence is employed, it is preferred that the cephalosporin C value derivative be in the form of its free acid.

Another method of treating the initially recovered derivative of the cephalosporin C value involves simply dissolving the derivative, whether as the free acid or as its quinoline salt, in a solvent which is suitable for carrying out cleavage of the N-acylated 5-aminoadipoyl substituent of the derivative of the cephalosporin C value. Sufficient residual amounts of impurities remain insoluble in solvents which typically are suitable for use in carrying out the cleavage reaction to permit, after their removal, use of the solution as such in the cleavage reaction. These residual impurities can be readily removed by any of the hereinbefore mentioned techniques. The solution of the derivative of the cephalosporin C value which remains after removal of the insoluble impurities normally will then be employed in the cleavage process without any need to isolate the derivative from the solvent.

Typical solvents which are employed in the cleavage process include, for example, halogenated hydrocarbons, such as chloroform, methylene chloride, and the like; ethers, such as tetrahydrofuran, dioxane, and the like.

It has been discovered to be highly advantageous to employ amides such as N,N-dimethylformamide, N,N-dimethylacetamide, and the like, in cleavage solvent mixtures. Such solvent mixtures can be employed herein, with a mixture of methylene chloride and N,N-dimethylacetamide being especially preferred.

In the event that this latter method is employed and the derivative of the cephalosporin C value is not isolated from the solvent medium prior to cleavage, it is highly preferred that the derivative be dried prior to being placed into the cleavage solvent medium. The drying treatment is important for the cleavage step since best cleavage results are obtained when substantially anhydrous conditions are employed. However, the suggested drying treatment is not important to the success of the process of this invention and thus is not required by it.

The cephalosporin C values employed as starting materials in the process of this invention can be in the form of their free acid in which case M in formula I is hydrogen. Alternatively and preferably, the cephalosporin C value is in the form of its alkali metal salt, such as the lithium, sodium, or potassium salt. Most preferably, the conditions of the process of this invention are such that the cephalosporin C value starting material is in the form of its sodium salt.

Cephalosporin C derivatives of the formula II, that is, compounds in which R is acetoxy, can be prepared in excellent yield from the alkali metal salt, preferably the sodium salt, of cephalosporin C. When the sodium salt of cephalosporin C contains relatively little "polysaccharide" impurity, it or its derivatives having the structure of formula II can be cleaved to 7-ACA in chloroform without troublesome emulsions developing. However, if the "polysaccharide" content of the sodium salt of cephalosporin C or its unpurified formula II derivative is relatively large, substantial emulsion problems develop upon cleavage in a chloroform medium. However, recrystallization of the cephalosporin C derivative II employing conditions which exploit the differences in solubility between the derivative and the "polysaccharide" impurities produces a material which can be cleaved to 7-ACA in chloroform without substantial emulsion difficulties. Such a material is produced irrespective of the amount of "polysaccharide" present in the cephalosporin C starting material from which the cephalosporin C derivative was obtained.

Additional benefits arising from the use of the derivatives of cephalosporin C values are:

1. Increased yields in the cleavage to 7-amino cephalosporins from cephalosporin C values.
2. Excellent quality of the produced 7-amino cephalosporins such that problems in the subsequent acylation reaction are minimized or completely avoided.
3. Reduced amounts of impurities in the intermediate products prepared in the sequence of production of the ultimate antibiotic.
4. Increased yields in acylation of the 7-amino cephalosporins to the ultimate antibiotic. Specifically, it has been discovered that the yield in acylation of 7-ACA to cephalothin increases from about 79% when carried out in the presence of "polysaccharide" impurities to about 92% when such impurities have been substantially eliminated from the 7-ACA starting material.

The invention is further illustrated by the following detailed examples which are not intended to be limiting upon the scope thereof.

EXAMPLE 1

A 60 gram portion of the sodium salt of cephalosporin C (128 millimoles) is stirred with 300 ml. of deionized water until solution is complete. About 300 ml. of acetone is added. The mixture is stirred and cooled to 5°C, during which time a precipitate of the sodium salt of cephalosporin C separates. The pH of the mixture is adjusted to the range of from 9.0 to 9.5 by addition of aqueous 20 percent sodium hydroxide solution. To the resulting solution, maintained at about 5°C, 19.7 ml. of 2,4-dichlorobenzoyl chloride (141 millimoles, 10 percent excess) are added with stirring over a period of 30 to 35 minutes. The pH of the mixture is maintained at 9.0 to 9.5 during addition of the 2,4-dichlorobenzoyl chloride by addition as needed of aqueous 20 percent sodium hydroxide solution. Upon completion of addition of the 2,4-dichlorobenzoyl chloride, the mixture is stirred at 5°C. for 10 minutes or until the pH remains steady at 9.0 to 9.5 for 2 minutes. The mixture then is acidified with concentrated hydrochloric acid to pH 6.5. The resulting mixture is treated with 300 ml. of water followed by 5 to 10 grams of a filter aid (Hyflo). The mixture is filtered through the filter aid (about one-fourth to one-half inch thick on a size 3 Buchner funnel). The precipitate is rinsed with about 50 ml. of water. The filtrate and the rinsings are combined, stirred, and warmed to 20°C. Concentrated hydrochloric acid is added to adjust the pH of the mixture to about pH 3.0. The solution is seeded with crystals of the product, obtained from a small laboratory sample, and the pH is adjusted to 2.7 with concentrated hydrochloric acid. The mixture is stirred for 30 minutes at 20° to 23°C. during which time N-(2,4-dichlorobenzoyl)cephalosporin C crystallizes (it oils out at first and then the oil droplets solidify). The mixture is acidified with concentrated hydrochloric acid to pH 1.8, stirred for about 2 to 3 minutes, and 300 ml. of water is added. The aqueous organic mixture is stirred for 2 to 3 minutes, cooled to 5°C., and stirred at 0° to 5°C. for one hour. The product is filtered, rinsed with about 500 ml. of water, and vacuum dried at 45°C. to obtain 68.0 grams (89.1 percent).

A mixture of 20.0 grams of the N-(2,4-dichlorobenzoyl)cephalosporin C product in 180 ml. of acetone, reagent grade, is stirred until a uniform mixture is obtained, and 9.0 ml. of de-ionized water is then added. The mixture is stirred until the product is dissolved (about 10 to 15 minutes). To the resulting solution are added 2 grams of a filter aid (Hyflo) and 2 grams of a decolorizing charcoal (Darco). The mixture is stirred for 5 minutes and then filtered through a filter aid pad (about 1 gram in a size 0 Buchner funnel). Filtration may be repeated, omitting the decolorizing charcoal, until the filtrate is clear. The minor amount of precipitate is rinsed with up to 20 ml. of acetone. The filtrate and rinsings are combined and stirred with 250 ml. of de-ionized water. The mixture is cooled to 25°C., and de-ionized water is added until the first trace of cloudiness persists, (after about 75 to 110 ml. of water is added). The mixture is then seeded with 0.50 grams of recrystallized product. The mixture is stirred for 30 minutes at ambient temperature (23°–25°C). About 350 ml. of water is added with stirring over a period of 40 minutes. Upon completion of the water addition, the mixture is cooled and maintained at 5°C. for one hour. The resulting mixture is filtered, washed with water and dried in vacuo at 45°C. The yield of N-(2,4-di-chlorobenzoyl) cephalosporin C is 16-16.5 grams.

EXAMPLE 2

A 60 g. (134 millimoles) portion of the sodium salt of cephalosporin C was stirred in 300 ml. of water until it dissolved. About 150 ml. of acetone was added, and the solution was stirred and cooled to 10°C. The pH of the solution was adjusted to pH 9.0 with aqueous 20 percent sodium hydroxide solution, and 17 ml. (134 millimoles) of 4-chlorobenzoyl chloride were added. The mixture was stirred at 10°–15°C. for 30 minutes during which time aqueous 20 percent sodium hydroxide solution was added in an amount sufficient to maintain the pH of the mixture at approximately 9.0. About 1050 ml. of water, in two portions of 800 ml. and 250 ml., were then added, and the pH was adjusted to 1.9 with conc. hydrochloric acid. The mixture was seeded with crystals of N-(4-chlorobenzoyl)cephalosporin C and cooled in an ice-bath. The mixture was refrigerated (about 5°C.) overnight. The crystalline solid in the mixture was filtered, rinsed with water, and dried in vacuo at 40°C. The crystalline N-(4-chlorobenzoyl)cephalosporin C product weighed 55.7 g.

The partially purified N-(4-chlorobenzoyl)cephalosporin C is further purified by recrystallization in accordance with the procedure illustrated in Example 1.

EXAMPLE 3

A 11.8 g. (20 millimoles) portion of N-(2,4-dichlorobenzoyl)cephalosporin C was stirred in 150 ml. of amylene-inhibited chloroform. To the above mixture 5.70 ml. (48 millimoles) of quinoline and 8.80 ml. (95 millimoles) of N,N-dimethylacetamide were added. The temperature of the mixture rose to about 28°C. The mixture was cooled to 15° C., and 9.60 ml. (135 millimoles) of acetyl chloride were added rapidly. The temperature of the mixture rose to 23°C. The mixture was stirred at about 24°–25°C. for 40 minutes during which time the N-(2,4-dichlorobenzoyl)cephalosporin C dissolved. The mixture was then cooled to −35°C., and 26 ml. (162 millimoles) of N,N-diethylaniline were added. The mixture was re-cooled to −25°C., and 9.8 g. (47 millimoles) of phosphorus pentachloride were added. The mixture was stirred for 30 minutes at −15°C., cooled to −40°C., and 34 ml. of propylene glycol were added. The resulting mixture was stirred for 1 ½– 2 hours at 0°C., cooled to −15°C., and 100 ml. of ice and water were added. The aqueous phase was separated from the organic phase, and the organic phase was extracted with 20 ml. of water. The aqueous phases were combined and adjusted to pH 3.5 with conc. ammonium hydroxide. A solid precipitated and was filtered, washed successively with water, methanol, and acetone, and dried to obtain 4.8 – 5.0 g. of 7-aminocephalosporanic acid.

EXAMPLE 4

Following the procedure of Example 1, the sodium salt of desacetoxycephalosporin C (a compound of formula I in which R is hydrogen) is dissolved in a water-/acetone mixture and treated with 2,4-dichlorobenzoyl chloride to form N-(2,4-dichlorobenzoyl)desacetoxycephalosporin C acid. This derivative is purified in accordance with the procedure described in Example 1. The purified acid product, upon being treated with phosphorus pentachloride in the presence of pyridine, forms the imino-chloride; the imino-chloride, upon being treated with an alcohol or an alkanediol, forms the imino-ether; the imino-ether, upon treatment with water, cleaves the side chain to form 7-aminodesacetoxycephalosporanic acid (7—ADCA). This latter cephalosporin nucleus compound is named in U.S. Pat. No. 3,124,576 and can be used to prepare by known acylation procedures cephalosporin antibiotics such as cephalexin and cephradine.

EXAMPLE 5

One liter of cephalosporin C resin eluate (assayed by UV method at 48.2 mg./ml. and by nicotinamide method at 38.46 mg./ml.) having a pH of 5.5 was cooled to a temperature of +6°C. To the mixture were added 200 ml. of acetone, and the temperature and pH rose to +10°C. and 5.9, respectively. The pH of the mixture was adjusted to 9.5 by addition of 22 ml. of 25 percent aqueous sodium hydroxide. The resulting cephalosporin C, sodium salt, was acylated over a 20 minute period by addition of 31.4 ml. (224 millimoles) of 2,4-dichlorobenzoyl chloride. The pH of the mixture was maintained at about 9.5 by accompanying addition of 53 ml. of 25 percent aqueous sodium hydroxide. At the end of the addition, the temperature of the reaction mixture had risen to 22°C. The pH of the mixture was adjusted to 5.0 by addition of 20 ml. of 25 percent aqueous sulfuric acid. To the mixture were added 20 g. of a filter aid, and the resulting mixture was filtered. The pH of the filtrate was lowered to 3.4 by addition of 45 ml. of 25 percent aqueous sulfuric acid. To the resulting acidified mixture were added slowly over a 10 minute period 28.4 ml. (336 millimoles) of quinoline, and the pH of the mixture was maintained at 3.3 to 3.5 during addition by accompanying addition of 27 ml. of 25 percent aqueous sulfuric acid. The resulting mixture was seeded with N-(2,4-dichlorobenzoyl)cephalosporin C, quinoline salt, which had been previously prepared on a small scale. The mixture was then stirred at room temperature for 30 minutes and at 5°C. for 165 minutes. The mixture was then filtered, and the filter cake was washed with one liter of cold water. The cake was dried at 40°C. in a vacuum oven to obtain 73 g. (95.6 percent yield) of N-(2,4-dichlorobenzoyl)cephalosporin C, quinoline salt (87.1 percent purity).

EXAMPLE 6

To a mixture of 100 ml. of acetone, 15 ml. of N,N-dimethylacetamide, and 2 ml. of quinoline were added 14.7 g. of N-(2,4-dichlorobenzoyl)cephalosporin C, quinoline salt, obtained from Example 5. The mixture was stirred for about 30 minutes, and 2 g. of a filter aid were added. The resulting mixture was filtered, and the weight of the dried filter cake was 2.72 g. The filtrate was concentrated to a small volume and transferred to standard cleavage equipment with addition of 150 ml. of methylene chloride. Acetyl chloride (10 ml.) was added, and the temperature of the mixture increased from 22°C. to 26°C. The mixture was stirred for 20 minutes, cooled to −15°C., and 26 ml. of N,N-diethylaniline were added. To the mixture maintained at about −15°C. were added 9.8 g. of phosphorus pentachloride, and the mixture was stirred for 75 minutes. Propylene glycol (25 ml.) was added, and the temperature of the mixture increased from −15°C. to +2°C. The mixture was stirred at about +5°C. for 2.5 hours. To the mixture were then added 100 ml. of ice water. The mixture was stirred for 10 minutes, the aqueous and organic phases were separated, and the pH of the aqueous phase was increased from 0.7 to 3.5 by addition of 15.5 ml. of concentrated ammonium hydroxide. The aqueous mixture was stirred for about 30 minutes and was then filtered. The filter cake was washed with 25 ml. of cold 50 percent aqueous methanol followed by 50 ml. of cold methanol. The filter cake was dried in vacuo at 40°C. overnight to obtain 2.73 g. of 7-aminocephalosporanic acid.

EXAMPLE 7

A mixture of 50 g. of crude cephalosporin C [assayed by UV method as 85.5 millimoles (35.4 g.) of active material] in 500 ml. of water was prepared. The mixture was stirred at room temperature for 10 minutes. To the mixture were added 100 ml. of acetone, and the pH of the resulting mixture was 7.8. The pH of the mixture was adjusted to 9.5 by addition of 6 ml. of 25 percent aqueous sodium hydroxide. The resulting cephalosporin C, sodium salt, was acylated by addition of 24 ml. (171 millimoles) of 2,4-dichlorobenzoyl chloride. The addition was made over a 20 minute period, and the temperature of the mixture rose to 29°C. During addition, the pH of the mixture was maintained at about 9.5 by addition of 25 ml. of 25 percent aqueous sodium hydroxide. The resulting mixture was stirred for about 10 minutes with the pH remaining at about 9.5. The pH of the mixture was adjusted to 5.0 by addition of 3 ml. of 25 percent aqueous sulfuric acid. To the resulting mixture were added 10 g. of a filter aid, and the mixture was filtered. The filtrate was turbid, and the pH of the mixture was lowered to 3.5 by addition of 25 percent aqueous sulfuric acid. To the resulting mixture were added slowly 25 ml. (212 millimoles) of quinoline, and the pH of the mixture was maintained during addition at 3.3 to 3.5 by accompanying addition of 25 percent aqueous sulfuric acid. The pH of the final mixture was 3.3. The mixture was seeded by addition of crystals of N-(2,4-dichlorobenzoyl)cephalosporin C, quinoline salt. The mixture was stirred at room temperature for 20 minutes and in an ice bath for 30 minutes. The mixture was filtered, and the filter cake was washed with 1.5 liters of ice water. The resulting cake was dried in vacuo at 40°C. for 40 hours to obtain 58 g. (81.0 percent yield) of N-(2,4-dichlorobenzoyl)-cephalosporin C, quinoline salt (94.1 percent purity).

EXAMPLE 8

To a mixture of 150 ml. of methylene chloride, 15 ml. of N,N-dimethylacetamide, and 2 ml. of quinoline were added 14.7 g. of N-(2,4-dichlorobenzoyl)cephalosporin C, quinoline salt, obtained from Example 7. The mixture was stirred for about 30 minutes. To the mixture were then added 2 g. of a filter aid, and the mixture was filtered. The dried filter cake which resulted weighed 3.51 g. The filtrate was then transferred to standard cleavage equipment, and 10 ml. of acetyl chloride was added during which time the temperature increased from 18°C. to 24°C. The mixture was stirred for 20 minutes, cooled to −10°C., and 26 ml. of N,N-diethylaniline were added. The temperature of the mixture during addition was maintained at about −6°C. Phosphorus pentachloride (9.8 g.) was added, and the mixture was stirred for 50 minutes at about −15°C. Propylene glycol (25 ml.) was added to the mixture, and the temperature of the mixture increased from −15°C. to +11°C. The mixture was cooled to about 5°C. and stirred for 2 hours. To the mixture were then added 100 ml. of ice water, and the mixture was stirred 10 minutes, separated into an aqueous and an organic phase, and the pH of the aqueous phase was increased from 0.9 to 3.4 by addition of 12 ml. of concentrated ammonium hydroxide. The mixture was stirred for 30 minutes, filtered, and the filter cake was washed with 25 ml. of cold 50 percent aqueous methanol followed by 50 ml. of cold methanol. The filter cake was dried in vacuo at 40°C. overnight to obtain 3.36 g. of 7-aminocephalosporanic acid.

We claim:

1. An improved process for separating a fermentation-derived cephalosporin C value of the formula

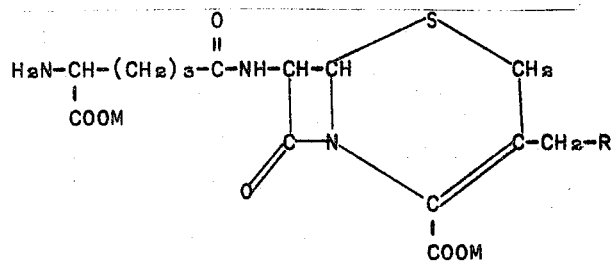

in which each M is hydrogen or an alkali metal, and R is hydrogen, acetoxy, hydroxy, or methylthio, from polysaccharide and proteinaceous impurities, which comprises A. reacting the crude cephalosporin C value of formula (I) in an aqueous liquid medium containing a miscible, inert organic solvent and containing said impurities with a 2,4-dichlorobenzoyl halide or a 4-chlorobenzoyl halide to form an N-acyl cephalosporin C value of the formula (II)

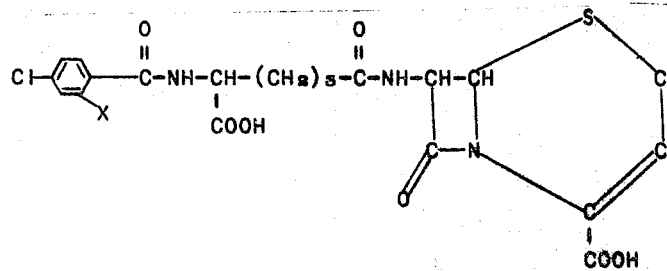

in which X is hydrogen or chlorine and R is as defined above, which compound is soluble in the aqueous-organic liquid medium; and B. separating polysaccharide and proteinaceous impurities from said N-acyl cephalosporin C value.

2. Process of claim 1, in which step (B) comprises
  1. separating insolubles from said aqueous-organic liquid medium;
  2. treating the liquid medium from step (1) to crystallize the N-acyl cephalosporin C value;
  3. separating the N-acyl cephalosporin C value;
  4. dissolving the separated N-acyl cephalosporin C value in an organic water-miscible liquid solvent containing up to about 15% water;
  5. separating insolubles from the liquid mixture obtained in step (4);
  6. treating the liquid fraction from step (5) with an aqueous medium to precipitate the N-acyl cephalosporin C value; and
  7. separating the precipitated N-acyl cephalosporin C value from the liquid mixture.

3. Process of claim 2, which comprises
  a. reacting crude cephalosporin C or an alkali metal salt thereof with 2,4-dichlorobenzoyl chloride in an aqueous acetone mixture containing polysaccharide and proteinaceous impurities to form N-(2,4-dichlorobenzoyl)cephalosporin C;
  b. filtering insoluble impurities from the aqueous acetone mixture;
  c. lowering the pH of the filtered aqueous acetone mixture to a pH of from about pH 1.5 to about 3.5 to crystallize the N-(2,4-dichlorobenzoyl)cephalosporin C;
  d. separating the crystalline N-(2,4-dichlorobenzoyl)cephalosporin C from the aqueous acetone medium of step (c);
  e. dissolving the separated N-(2,4-dichlorobenzoyl)cephalosporin C in acetone containing up to about 15 percent water;
  f. filtering insolubles from the liquid mixture obtained from step (e);
  g. treating the filtrate from step (f) with water to effect recrystallization of the N-(2,4-dichlorobenzoyl)cephalosporin C; and
  h. separating the crystalline N-(2,4-dichlorobenzoyl)cephalosporin C from the liquid mixture of step (g).

4. Process of claim 2, which comprises
  a. reacting crude cephalosporin C or an alkali metal salt thereof with 4-chlorobenzoyl chloride in an aqueous acetone mixture containing polysaccharide and proteinaceous impurities to form N-(4-chlorobenzoyl)-cephalosporin C;
  b. filtering insoluble impurities from the aqueous acetone mixture;
  c. lowering the pH of the filtered aqueous acetone mixture to a pH of from about pH 1.5 to about pH 3.5 to crystallize the N-(4-chlorobenzoyl)cephalosporin C;
  d. separating the crystalline N-(4-chlorobenzoyl)-cephalosporin C from the aqueous acetone medium of step (c);
  e. dissolving the separated N-(4-chlorobenzoyl)-cephalosporin C in acetone containing up to about 15 percent water;
  f. filtering insolubles from the liquid mixture obtained from step (e);
  g. treating the filtrate from step (f) with water to effect recrystallization of the N-(4-chlorobenzoyl)-cephalosporin C; and
  h. separating the crystalline N-(4-chlorobenzoyl)-cephalosporin C from the liquid mixture of step (g).

5. Process of claim 1, in which said step (B) comprises 1. separating insolubles from said aqueous-organic liquid medium;
2. treating the liquid medium from step (1) to crystallize the N-acyl cephalosporin C value;
3. separating the N-acyl cephalosporin C value;
4. dissolving the separated N-acyl cephalosprin C value in a solvent suitable for carrying out cleavage of the 7-acyl group; and
5. separating insolubles from the solution obtained from step (4).

6. Process of claim 5, which comprises
   a. reacting crude cephalosporin C or an alkali metal salt thereof with 2,4-dichlorobenzoyl chloride in an aqueous acetone mixture containing polysaccharide and proteinaceous impurities to form N-(2,4-dichlorobenzoyl)-cephalosporin C;
   b. filtering insoluble impurities from the aqueous acetone mixture;
   c. lowering the pH of the filtered aqueous acetone mixture to a pH of from about pH 1.5 to about pH 3.5;
   d. separating crystalline N-(2,4-dichlorobenzoyl)-cephalosporin C from the aqueous acetone medium of step (c);
   e. dissolving the separated N-(2,4-dichlorobenzoyl)-cephalosporin C in a mixture of methylene chloride and N,N-dimethylacetamide suitable for carrying out cleavage of the 7-acyl group; and
   f. filtering insolubles from the liquid mixture obtained in step (e).

7. Process of claim 5, which comprises
   a. reacting crude cephalosporin C or an alkali metal salt thereof with 4-chlorobenzoyl chloride in an aqueous acetone mixture containing polysaccharide and proteinaceous impurities to form N-(4-chlorobenzoyl)-cephalosporin C;
   b. filtering insoluble impurities from the aqueous acetone mixture;
   c. lowering the pH of the filtered aqueous acetone mixture to a pH of from about pH 1.5 to about pH 3.5;
   d. separating crystalline N-(4-chlorobenzoyl)-cephalosporin C from the aqueous acetone medium of step (c);
   e. dissolving the separated N-(4-chlorobenzoyl)-cephalosporin C in a mixture of methylene chloride and N,N-dimethylacetamide suitable for carrying out cleavage of the 7-acyl group; and
   f. filtering insolubles from the liquid mixture obtained in step (e).

8. Process of claim 1, in which step (B) comprises
   1. separating insolubles from said aqueous-organic liquid medium;
   2. lowering the pH of the insolubles-free aqueous-organic liquid medium to from about pH 1.5 to about pH 3.5; and
   3. adding quinoline to the insolubles-free aqueous-organic liquid medium from step (2) to precipitate purified N-acyl cephalosporin C value in the form of its quinoline salt.

9. Process of claim 8, which comprises
   a. reacting crude cephalosporin C or an alkali metal salt thereof with 2,4-dichlorobenzoyl chloride in an aqueous acetone mixture containing polysaccharide and proteinaceous impurities to form N-(2,4-dichlorobenzoyl)-cephalosporin C;
   b. filtering insoluble impurities from the aqueous acetone mixture;
   c. lowering the pH of the filtered aqueous acetone medium to a pH of from about pH 1.5 to about pH 3.5; and
   d. adding from about 1.5 to about 12 moles of quinoline per mole of N-(2,4-dichlorobenzoyl)cephalosporin C to the filtered aqueous acetone medium from step (c) to precipitate purified N-(2,4-dichlorobenzoyl)cephalosporin C in the form of its quinoline salt.

10. Process of claim 8, which comprises
    a. reacting crude cephalosporin C or an alkali metal salt thereof with 4-chlorobenzoyl chloride in an aqueous acetone mixture containing polysaccharide and proteinaceous impurities to form N-(4-chlorobenzoyl)-cephalosporin C;
    b. filtering insoluble impurities from the aqueous acetone mixture;
    c. lowering the pH of the filter aqueous acetone medium to a pH of from about pH 1.5 to about pH 3.5; and
    d. adding from about 1.5 to about 12 moles of quinoline per mole of N-(4-chlorobenzoyl)cephalosporin C to the filtered aqueous acetone medium from step (c) to precipitate purified N-(4-chlorobenzoyl)cephalosporin C in the form of its quinoline salt.

* * * * *